(No Model.)
J. OWENS.
CUTTING ATTACHMENT FOR PLOWS.
No. 302,932. Patented Aug. 5, 1884.
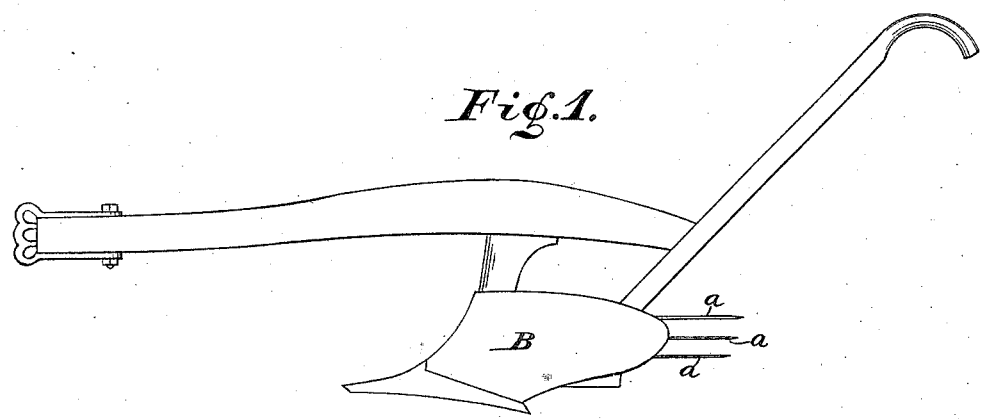
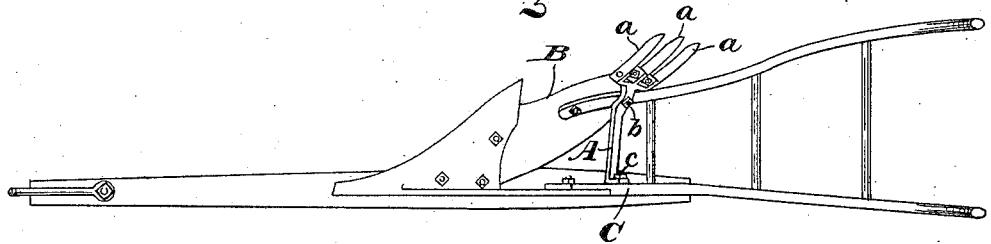
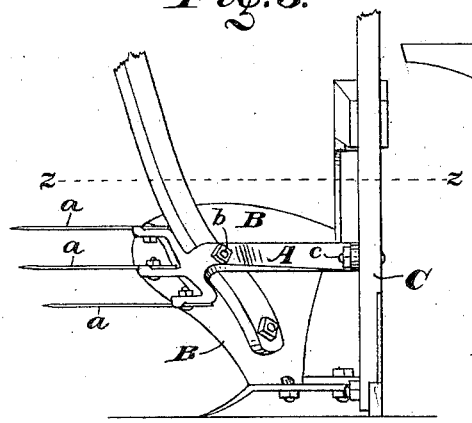
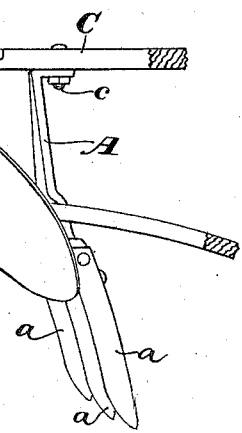
WITNESSES.
Chas. N. Leonard,
E. W. Bradford.
INVENTOR.
James Owens,
PER
C. Bradford,
ATTORNEY.

UNITED STATES PATENT OFFICE.

JAMES OWENS, OF CLINTON, PUTNAM COUNTY, INDIANA.

CUTTING ATTACHMENT FOR PLOWS.

SPECIFICATION forming part of Letters Patent No. 302,932, dated August 5, 1884.

Application filed April 19, 1884. (No model.)

*To all whom it may concern:*

Be it known that I, JAMES OWENS, of the township of Clinton, county of Putnam, and State of Indiana, have invented certain new and useful Improvements in Cutting Attachments for Plows, of which the following is a specification.

The object of my said invention is to provide an improved means whereby the soil may be effectually pulverized at the same time it is plowed, thus saving to a great extent the labor of harrowing. This object is accomplished by providing an attachment for the plow, consisting of a series of blades with which, when they are in position, the furrow will come in contact as it leaves the mold-board, and be thus split into several parts before falling into the position where it is finally left by the plow.

Referring to the accompanying drawings, which are made a part hereof, and on which similar letters of reference indicate similar parts, Figure 1 is a side elevation of a plow provided with my attachment; Fig. 2, an under side plan of the same; Fig. 3, a rear elevation on an enlarged scale, and Fig. 4 a horizontal sectional view looking downwardly from the dotted line $z$ $z$ in Fig. 3.

In said drawings my attachment is shown composed of a shank, A, having blades $a$, and is bolted to the mold-board B and standard or handle C by bolts $b$ and $c$, respectively. The blades extend out in suitable position to receive the furrow as it leaves the mold-board and split it into two, three, or more pieces, (according to the number of knives used,) thus making in effect several fine furrows, instead of one large and coarse one. This will be found especially valuable in "breaking," as the sod is thus cut into strips much more effectively than can be done by a harrow, and at no expense, the plowing and slitting being all done at one operation, and with but little extra expenditure of power. The shank of this attachment, it will be noticed, also serves as a brace or stay for the plow when in use, as it extends across from the mold-board to a standard or handle extending up from the landside, and is secured to both. This, however, is in addition to the usual construction, and is not essential, as the attachment is intended to be removable, rather than permanent, in order that the plow may be used without it when desired.

The drawings show a common or walking plow; but I do not desire to confine myself to this construction, as it is obvious that it is just as applicable to sulky-plows. In fact, my use of the invention has so far been in connection with the last-named variety.

I am aware that cutting devices have before been attached to the mold-board of plows for the purpose of pulverizing the furrow as it is turned; but I am not aware that the construction herein shown and claimed has ever been known or used prior to my invention thereof.

Having thus fully described my said invention, what I claim as new, and desire to secure by Letters Patent, is—

1. The combination, with a plow mold-board, of the branched brace and shank A, bolted to the mold-board and landside, and the cutting-blades $a$, substantially as shown and described.

2. The combination, with a plow, of a cutting attachment, the shank whereof extends across from the mold-board to the landside or a standard or handle attached thereto, and is secured to both, thus forming also a brace for the plow, substantially as set forth.

3. The combination of the cutting device composed of shank A and blades $a$, and the plow mold-board B, and standard or handle C, said shank being secured to said mold-board and standard by bolts $b$ and $c$, substantially as shown and specified.

In witness whereof I have hereunto set my hand and seal, at Indianapolis, Indiana, this 15th day of April, A. D. 1884.

JAMES OWENS. [L. S.]

In presence of—
C. BRADFORD,
CHAS. L. THURBER.